(12) United States Patent
Sakata et al.

(10) Patent No.: US 6,901,141 B1
(45) Date of Patent: May 31, 2005

(54) ECHO CANCELLER

(75) Inventors: Yoshio Sakata, Tokyo (JP); Hideki Kamoi, Tokyo (JP); Hiroki Gouko, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 09/353,448

(22) Filed: Jul. 14, 1999

(30) Foreign Application Priority Data

Jul. 22, 1998 (JP) .......................................... 10-206069

(51) Int. Cl.⁷ .......................... H04M 1/00; H04M 9/00; H04M 9/08

(52) U.S. Cl. .......................... 379/406.01; 379/406.05; 379/406.08; 379/406.09; 379/406.07; 379/406.16

(58) Field of Search ........................ 379/406.01–406.16

(56) References Cited

U.S. PATENT DOCUMENTS 6,212,273 B1 * 4/2001 Hemkumar et al.
6,236,725 B1 * 5/2001 Takada et al.

FOREIGN PATENT DOCUMENTS

| JP | 362269451 A | * 11/1987 |
| JP | 407264279 A | * 10/1995 |
| JP | 08-279777 | * 10/1996 |
| JP | 408279777 A | * 10/1996 |

* cited by examiner

Primary Examiner—Duc Nguyen
(74) Attorney, Agent, or Firm—Volentine Francos & Whitt, PLLC

(57) ABSTRACT

An adaptive digital filter (10) is adapted to generate a pseudo echo Se which is produced by imitating a noise, using part of receiving signals Si and to output it. An echo produced through an echo path (15) is mixed, as an echo noise, with a sending signal So and this sending signal is attenuated by a level attenuator (6). The level attenuator (6), in order to match the amplitude level of the echo noise of the sending signal So to that of the pseudo echo, attenuates the sending signal So and feeds it to a subtracter (7). The subtracter (7) eliminates echo noises by subtracting the pseudo echo Se from the sending signal So. Even if the echo path is in the state of amplified system, the complete elimination of the echo can be achieved accordingly.

6 Claims, 3 Drawing Sheets

ECHO CANCELLER

BACKGROUND OF THE INVENTION

1. Field of the Invention

The present invention relates to an echo canceller used to eliminate echo noises caused by acoustic coupling during communications between a telephone talker and a listener, for example, in a hand-free telephone system.

2. Description of the Related Art

For example, in a hand-free telephone system, echo noises caused by acoustic coupling between a microphone (transmitter) and a loudspeaker (receiver) have been a cause for the reduction in speech quality. The hand-free telephone system herein refers to a system which is one of forms of car phone systems predisposed at a specified position in a car to ensure operability and safety for a driver, thereby allowing a telephone call using a microphone and a loudspeaker.

An echo canceller has been used to eliminate such echo noises. The conventional echo canceller is equipped with an adaptive digital filter composed of a transversal filter. This adaptive digital filter estimates impulse responses, i.e., transmission characteristics of an echo path formed between a loudspeaker and a microphone. The transversal filter is designed to be activated imitating these transmission characteristics of the echo path. This imitation process is achieved by changing numbers of taps of the transversal filter. By inputting part of receiving signals to be fed to the loudspeaker into this transversal filter thus adapted to be activated imitating the transmission characteristics of the echo path, pseudo echoes being closely analogous to such echo noises as described above can be obtained from the output of the filter. Echo noises are thus eliminated by subtracting the pseudo echo signals from sending signals fed by the microphone.

In the related arts, however, there still exist problems to be resolved. That is, as described above, the pseudo echo is the output obtained by inputting part of receiving signals into the transversal filter. Therefore, the amplitude level of the pseudo echo is not allowed to exceed that of the receiving signals. However, in some cases, echo noises mixed with the sending signals may be signals the amplitude of which exceed that of the echo noise, which occurs, for example, when the volume of a microphone is made larger. In such a case, there is a problem left that the echo noise cannot be eliminated by using the pseudo echo of this kind.

The present invention has been made to solve the above problems and includes the following three constitutions.

One aspect of the present invention as shown in the Constitution 1 is to provide an echo canceller for eliminating echoes produced through an echo path formed between a loudspeaker used to convert receiving signals into voices to be emitted and a microphone used to convert voice inputs into sending signals, comprising an adaptive digital filter designed to be activated imitating transmission characteristics of the echo path and to generate pseudo echo signals using part of the receiving signals fed therein and to output them, an attenuator used to attenuate the sending signals containing echo noises fed by the microphone to which echoes have been inputted so that the amplitude level of the echo noises is matched to that of the pseudo echo signals and a subtracter used to subtract the pseudo echo signals from the sending signals containing the attenuated echo noises.

Another aspect of the present invention as shown in the Constitution 2 is to provide an echo canceller for eliminating echoes produced through an echo path formed between a loudspeaker used to convert receiving signals into voices to be emitted and a microphone used to convert voice inputs into sending signals, comprising an adaptive digital filter designed to be activated imitating transmission characteristics of the echo path and to generate pseudo echo signals using part of the receiving signals and output them, a subtracter used to subtract the pseudo echo signals from the sending signals containing the echo noises fed by the microphone to which echoes have been inputted and an amplifier used to amplify the pseudo echo signals so that the amplitude level of the pseudo echoes is matched to that of the echo noises and to feed the amplified signals to said substracter.

A third aspect of the present invention as shown in the Constitution 3 is to provide an echo canceller for eliminating echoes produced through an echo path formed between a loudspeaker used to convert receiving signals into voices to be emitted and a microphone used to convert voice inputs into sending signals, comprising an adaptive digital filter designed to be activated imitating transmission characteristics of the echo path and to generate pseudo echo signals using part of the receiving signals and output them, a subtracter used to subtract the pseudo echo signals from the sending signals containing the echo noises fed by the microphone to which echoes have been inputted and an amplifier used to amplify part of the receiving signals so that the amplitude level of the pseudo echoes is matched to that of the echo noises and to feed them to said adaptive digital filter.

DESCRIPTION OF THE PREFERRED EMBODIMENTS

The preferred embodiments of the present invention will be hereinbelow described with reference to the accompanying drawings.

First Embodiment

According to the first embodiment of the present invention, an echo canceller is equipped with an adaptive digital filter adapted to estimate transmission characteristics of an echo path formed between a loudspeaker and a microphone, further having therein a transversal filter designed to be activated imitating the transmission characteristics of the echo path. This adaptive digital filter takes in part of receiving signals, generates pseudo echo signals and outputs them.

On the other hand, sending signals containing echo noises caused by echoes produced through the echo path are inputted to a level attenuator. The level attenuator attenuates the amplitude of the sending signals to a specified level and feeds the attenuated signals to a subtracter. That is, the level attenuator attenuates echo noises in order to match the amplitude level of the pseudo echo to that of echo noises and feeds the attenuated echo noises to the subtracter.

Figure 1:
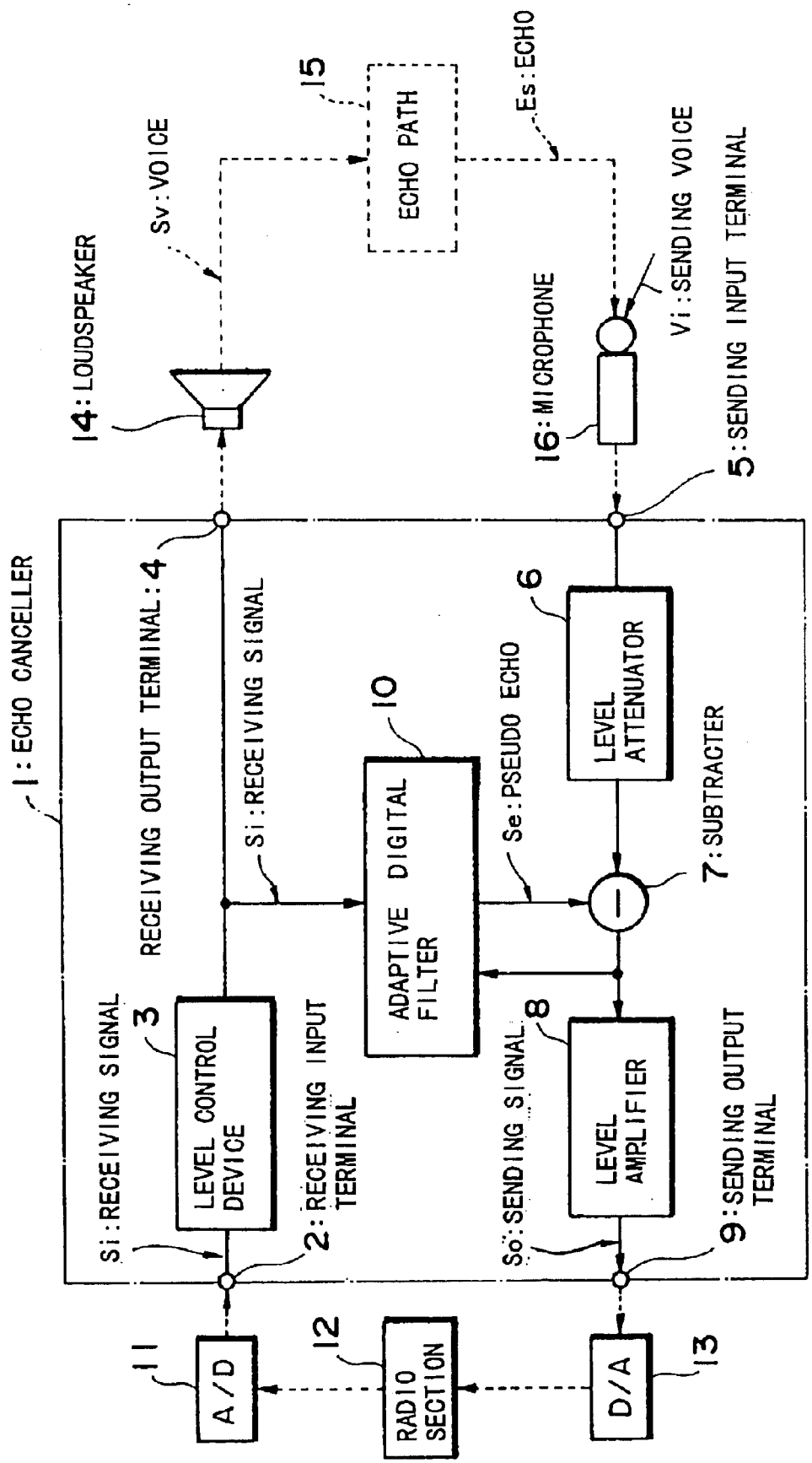
FIG. 1 is a block diagram showing an echo canceller in accordance with the first embodiment of the present invention.

FIG. 1 is a block diagram showing an echo canceller 1 in accordance with the first embodiment of the present invention.

Prior to description of the constitution of the echo canceller 1, relations between the echo canceller 1 and its peripheral devices will be described.

As shown in FIG. 1, the echo canceller 1 of the first embodiment is fed with a receiving signal Si via an A/D converter 11 from a radio section 12. This receiving signal Si is sent to a loudspeaker 14.

The loudspeaker 14 converts this receiving signal Si to voice Sv (sound wave) and emits the voice within a car. The voice Sv is changed to an echo Es (noise) after it has passed a plurality of paths and is then received by a microphone 16. In the description of the present invention, a plurality of paths is called an "echo path 15". The microphone 16 converts the echo Es having passed through the echo path together with a sending voice Vi into a sending signal So and feeds it to the echo canceller 1. The echo canceller 1, after having eliminated echo noises contained in this sending signal So, sends this signal via a D/A converter 13 to the radio section 12.

The constitution of the echo canceller 1 in the first embodiment will be further described below.

Referring to FIG. 1, the echo canceller 1 is provided with a receiving input terminal 2, level control device 3, receiving output terminal 4, sending input terminal 5, level attenuator 6, subtracter 7, level amplifier 8 and adaptive digital filter 10.

The receiving input terminal 2 is an input terminal of the echo canceller which receives the receiving signal Si via the A/D converter 11 from the radio section 12.

The level control device 3 is an automatic gain controller (AGC) used to hold the amplitude of the receiving signal to a specified level.

The receiving output terminal 4 is an output terminal of the echo canceller 1 used to feed the receiving signal Si to the loudspeaker 14.

The sending input terminal 5 is an input terminal used to receive the sending signal So fed by the mircrophone 16.

The level attenuator 6 is an attenuator (ATT) adapted to attenuate the sending signal So to a specified level.

The subtracter 7 subtracts the pseudo echo Se fed by the adaptive digital filter 10 from the sending signal So simultaneously fed by the level attenuator 6.

The level amplifier 8 receives the sending signal So, from which the pseudo echo Se has been subtracted, from the subtracter 7 and amplifies it to a specified level.

The sending output terminal 9 is an output terminal of the echo canceller 1 used to send the sending signal So via a D/A converter 13 to the radio section 12.

The adaptive digital filter 10 detects the echo Es which contains the voice Sv reflected against window glass, wall of a body of a car and the like and is received by the microphone, and then generates the pseudo echo Se being closely analogous to the echo Es and outputs it. To achieve these aims, the adaptive digital filter 10 estimates impulse responses, i.e., transmission characteristics of the echo path formed between the microphone 16 and the loudspeaker 14. The transversal filter embedded therein is designed to be activated imitating these transmission characteristics of the echo path. This imitation process is achieved by changing numbers of taps of the transversal filter. Thus, by inputting part of the receiving signal Si into the transversal filter adapted to be activated imitating the transmission characteristics of the echo path, the pseudo echo Se being closely analogous to the echo noise can be obtained from the output of the filter. The numbers of taps of the transversal filter is constantly changed depending on the state of the receiving signal Si and sending signal So accordingly.

In FIG. 1, when the receiving signal Si is inputted to the echo canceller 1 via an A/D converter 11 from the radio section 12, the level control device 3 receives the receiving signal Si via the receiving input terminal 2. At this point, if the amplitude level of the receiving signal Si exceeds the predetermined specified level, the level control device 3 activates the AGC to control the amplitude of the receiving signal Si to a specified level. The purpose is to suppress the saturation of the pseudo echo Se while it is being generated by the adaptive digital filter 10. Part of the receiving signal Si the amplitude of which has been controlled to a specified level is fed to the adaptive digital filter 10 and the remaining signals are sent via the receiving output terminal 4 to the loudspeaker 14.

The loudspeaker 14 converts the receiving signal Si into the voice Sv and emits it within a car. If the echo Es is produced through the echo path 15, it is then received by the microphone. The microphone 16 converts the echo Es together with the simultaneously received voice Vi into the sending signal So and inputs it to the echo canceller 1. The amplitude level of the echo noise contained in the sending signal So increases depending on the volume of the loudspeaker 14, conversion efficiency of the microphone 16 and the state of the echo path 15, regardless of the amplitude level of the receiving signal Si. This causes the amplitude level of the echo noise to be higher than that of the receiving signal Si in some cases. This state is defined as the echo path 15 being in amplified system. This echo path may be affected by the volume of the loudspeaker 14, conversion efficiency of the microphone and the like accordingly.

The sending signal So inputted to the echo canceller 1 is fed via the sending input terminal 5 to the level attenuator 6. If the echo path is in the state of amplified system, because high noises are emitted from the speaker 14, the attenuator in the level attenuator 6 is adjusted so that the amplitude of the sending signal So is controlled to a specified level. The sending signal So the amplitude of which has been controlled to a specified level is fed to the subtracter 7.

On the other hand, part of the receiving signal Si inputted to the adaptive digital filter 10 from the level control device 3 is fed to the transversal filter embedded within the adaptive digital filter. As described above, the transversal filter is designed to be activated imitating impulse responses, i.e., transmission characteristics of the echo path formed between the microphone 16 and the loudspeaker 14. Therefore, the output from this filter is the pseudo echo Se being closely analogous to the echo Es. The imitation process is achieved by changing numbers of taps of the transversal filter.

This pseudo echo Se is fed to the subtracter 7. The subtracter 7 eliminates the echo noise contained in the sending signal So by subtracting the pseudo echo signals from the sending signal So received from the level attenuator 6. In order to fully eliminate echo noise produced due to the echo Es, it is necessary to match the amplitude level of the echo noise to that of the pseudo echo Se. To do this, the level attenuator 6 is adjusted to attenuate the echo noise. This results in the elimination of echo noises from the sending signal So. Part of the sending signal So from which echo noises have been eliminated is sent to the adaptive digital filter 10 and the remaining signals to the level amplifier 8 respectively. The adaptive digital filter 10, when it receives part of the sending signal, changes numbers of taps thereof.

On the other hand, the level amplifier 8 amplifies the sending signal So to a specified level and sends the amplified signal through the sending output terminal 9 and D/A converter 13 to the radio section 12.

The above description has showed that the amount to be attenuated by the level attenuator 6 is variable and adjustable arbitrarily and also that the amplification factor to be reached by the level amplifier 8 is adjustable arbitrarily as well. However, the invention is not limited by particular details set forth in the above description. That is, if the amplified system for the echo path 15 is made limited in advance to a specified range, the amount to be attenuated by the level attenuator 6 and the amplification factor to be reached by the amplifier 8 are also limited to the specified range. Accordingly, by selecting specified amount to be attenuated and specified amplification factor to be reached within the designated ranges, the level attenuator 6 and the level amplifier 8 can be replaced with a fixed attenuator and a fixed amplifier respectively. Furthermore, in this embodiment, the radio section 12 is equipped with the D/A converter 13 at its inlet and the A/D converter 11 at its outlet and the echo canceller 1 is operated by digital signals. However, this embodiment is not limited to this constitution, i.e., the echo canceller can be operated by analog signals as well.

Because the level attenuator is provided which is used to attenuate the sending signal So containing echo noises to a specified level, even if the echo path is in the state of amplified system, the complete elimination of the echo Es is made possible.

Second Embodiment

According to the second embodiment of the present invention, the echo canceller is equipped with an amplifier adapted to amplify a pseudo echo, which is generated and outputted by an adaptive digital filter using part of sending signals, to a specified level and to output it as an enlarged echo. This enlarged echo is subtracted from sending signals mixed with echo noises caused by an echo produced through an echo path. That is, echo noises are eliminated by adjusting an amplification factor of the amplifier so that the amplitude level of the pseudo echo is matched to that of the echo noise.

Figure 2:
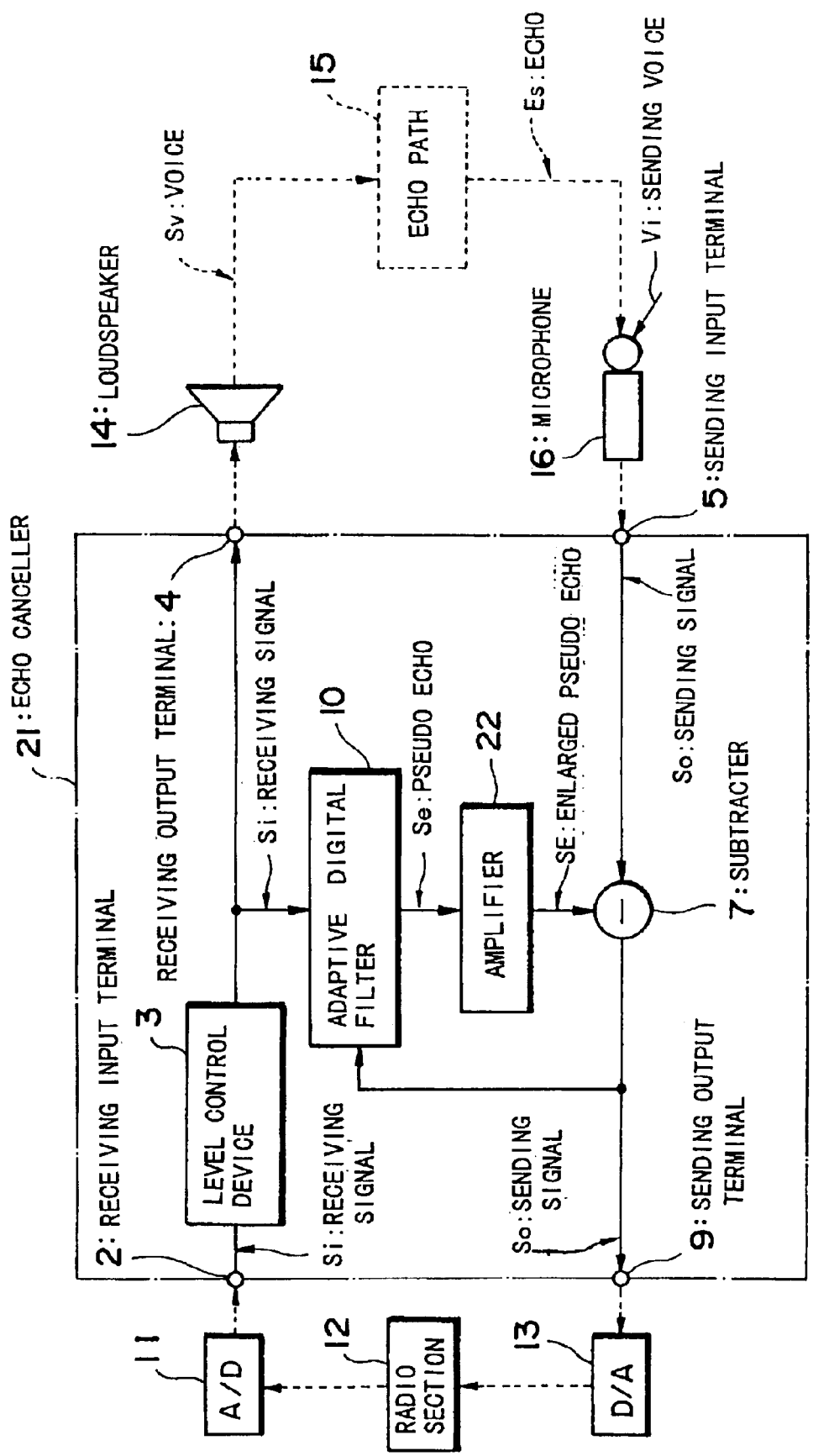
FIG. 2 is a block diagram showing an echo canceller in accordance with the second embodiment of the present invention.

FIG. 2 is a block diagram showing an echo canceller in accordance with the second embodiment of the present invention.

In FIG. 2, the echo canceller 21 is provided with a receiving input terminal 2, level control device 3, receiving output terminal 4, sending input terminal 5, attenuator 7, sending output terminal 9, adaptive digital filter 10 and amplifier 22.

Only differences between the echo cancellers in the first and second embodiments are hereinbelow described.

The amplifier 22 amplifies the pseudo echo Se fed from the adaptive digital filter 10 to a specified level and feeds it as an enlarged pseudo echo SE to a subtracter 7.

Other constitutions are all the same as those in the first embodiment.

When a receiving signal Si is inputted to the echo canceller 21 via an A/D converter 11 from the radio section 12, the level control device 3 takes in the receiving signal Si via the receiving input terminal 2. At this point, if the amplitude of receiving signal Si exceeds a predetermined level, the level control device 3 activates the AGC to control the receiving signal to a specified level. The purpose is to suppress the saturation of the pseudo echo Se while it is being generated by the adaptive digital filter 10. Part of the receiving signal Si the amplitude of which has been controlled to a specified level is fed to the adaptive digital filter 10 and the remaining signals are sent via the receiving output terminal 4 to the loudspeaker 14.

The loudspeaker 14 converts the receiving signal Si to a voice Sv and emits it within a car. The echo Es produced through the echo path 15 is received by a microphone 16. The microphone 16 converts the echo Es together with a sending voice Vi into a sending signal So and inputs it to the echo canceller 21.

If the echo path 15 is in the state of amplified system, the sending signal So inputted into the echo canceller 21 is fed at a high amplitude level via the sending input terminal 5 to the subtracter 7.

Also, part of the receiving signal Si inputted to the adaptive digital filter 10 from the level control device 3 is inputted to a transversal filter embedded within the adaptive digital filter. As described above, the transversal filter is designed to be activated imitating impulse responses, i.e., transmission characteristics of the echo path formed between the microphone 16 and the loudspeaker 14. Therefore, its output is the pseudo echo Se being closely analogous to the echo Es. The imitation process is achieved by changing numbers of taps of the transversal filter.

The pseudo echo Se is fed to the amplifier 22. The amplifier 22 receives this pseudo echo Se, amplifies it to a specified level and outputs it to a subtracter 7. This amplified pseudo echo is defined as an enlarged pseudo echo SE. The subtracter 7 eliminates echo noises contained in the sending signal So by subtracting the enlarged pseudo echo SE from the sending signal So fed by the microphone 16. In order to completely eliminate echo noises caused by the echo Es, it is required that the amplitude level of the enlarged pseudo echo SE is matched to that of the echo noise signal. Accordingly, the amplification is so performed by adjusting the amplification factor of the amplifier 22 that the amplitude of the pseudo echo is matched to that of the echo noise. As a result, it is made possible to eliminate echo noises from the sending signal So.

The above description has showed that the amplification system of the amplifier 22 is variable and adjustable arbitrarily. However, the invention is not limited by particular details set forth in the above description. That is, if the amplified system for the echo path 15 is made limited in advance to a specified range, the amplification factor of the amplifier 22 are also limited to the specified range. Accordingly, by selecting a specified amplification factor to be reached within the designated range, the amplifier 22 can be replaced with a fixed amplifier. Furthermore, in this embodiment, the radio section 12 is equipped with the D/A converter 13 at its inlet and the A/D converter 11 at its outlet and the echo canceller 21 is operated by digital signals. However, this embodiment is not limited to this constitution, i.e., the echo canceller can be operated by analog signals as well.

By being equipped with the amplifier used to feed the enlarged pseudo echo SE, which is obtained by amplifying the pseudo echo Se fed by the adaptive digital filter to a specified level, to the subtracter, even if the echo path is in the state of amplified system, the complete elimination of the echo Es by the echo canceller has been achieved.

Third Embodiment

Figure 3:
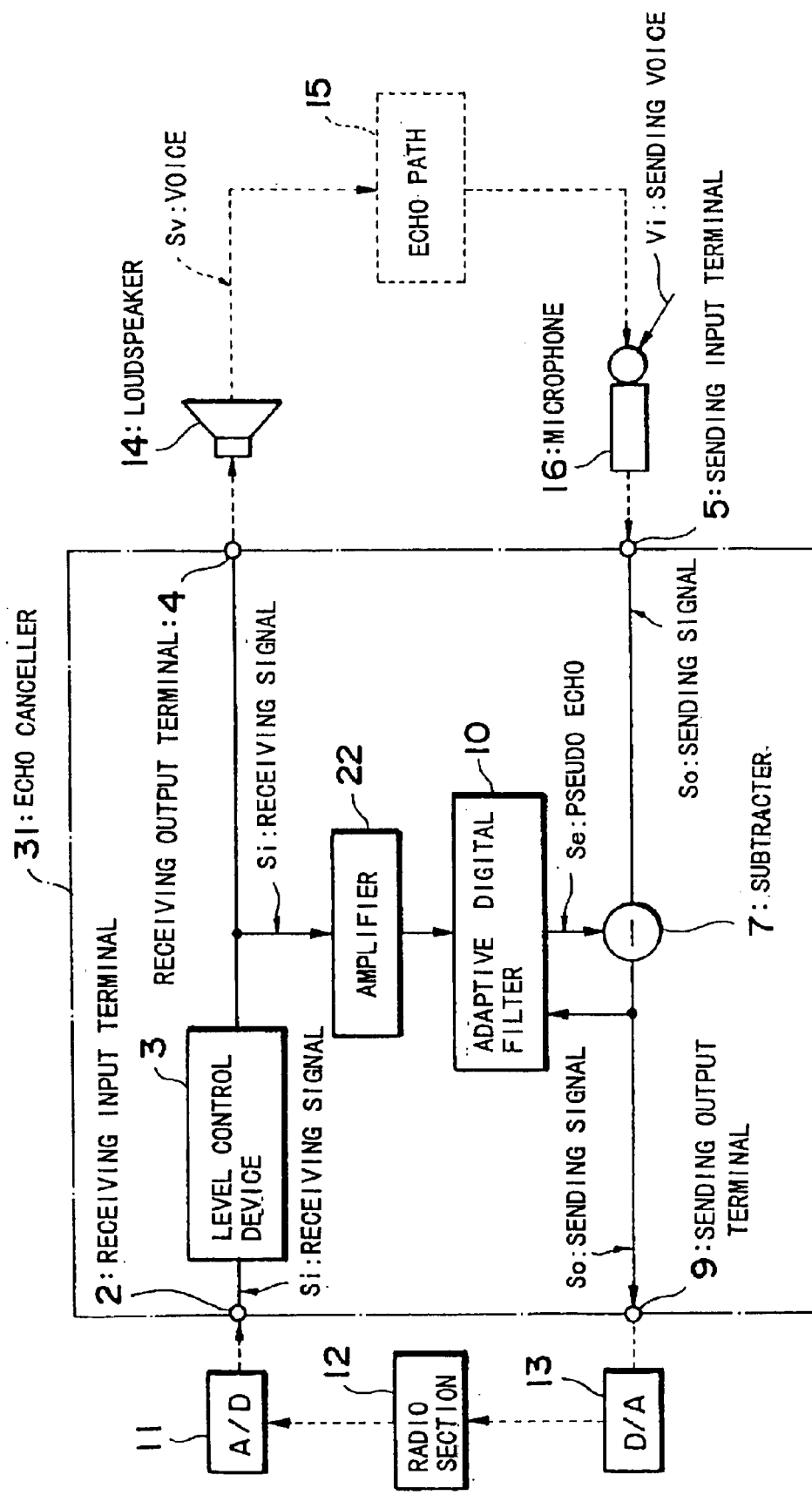
FIG. 3 is a block diagram showing an echo canceller in accordance with the third embodiment of the present invention.

FIG. 3 is a block diagram showing an echo canceller in accordance with the third embodiment of the present invention.

In FIG. 3, an echo canceller 31 is provided with a receiving input terminal 2, level control device 3, receiving output terminal 4, sending input terminal 5, subtracter 7, sending output terminal 9, adaptive digital filter 10 and amplifier 22.

Only differences between the echo cancellers in the first and second embodiments are hereinbelow described.

The amplifier 22 takes in part of the receiving signal Si, amplifies it to a specified level and feeds it to the adaptive digital filter 10.

In the second embodiment, the pseudo echo Se to be outputted from the adaptive digital filter 10 is amplified. In this third embodiment, the receiving signal Si is amplified before it is fed to the adaptive digital filter 10. That is, the receiving signal Si is amplified by adjusting the amplification factor of this amplifier 22 so that the amplitude level of the pseudo echo Se is matched to that of the echo noise produced through the echo path, thereby eliminating the echo noise thereof.

By being provided with the amplifier used to amplify part of the receiving signal to a specified level before it is fed to the adaptive digital filter 10 and to feed the amplified signal to the adaptive digital filter, both the elimination of echo noises and the prevention of malfunctions of the adaptive digital filter 10, which may occur when the receiving signal level is reduced, can be achieved in the echo canceller.

What is claimed is:

1. An echo canceller that eliminates echoes produced in an echo path formed between a loudspeaker that converts receiving signals into voice output and a microphone that converts voice input into sending signals, the echo canceller comprising:

an adaptive digital filter, designed to imitate transmission characteristics of the echo path, that generates pseudo echo signals responsive to a part of the receiving signals;

a subtracter that subtracts the pseudo echo signals from the sending signals containing echo noise that is input to the microphone from the echo path, to provide an echo canceled sending signal;

wherein tap coefficients of said adaptive digital filter are modified responsive to the part of the receiving signals and a part of the echo canceled sending signal; and an attenuator that attenuates the sending signals containing echo noise so that an amplitude level of the echo noise matches an amplitude level of the pseudo echo signals, and that provides the attenuated sending signals to said subtracter as the sending signals for subtraction.

2. The echo canceller of claim 1, wherein said attenuator is a variable attenuator.

3. The echo canceller of claim 1, wherein said attenuator is a fixed attenuator.

4. An echo canceller that eliminates echoes produced in an echo path formed between a loudspeaker that converts receiving signals into voice output and a microphone that converts voice input into sending signals, the echo canceller comprising:

an adaptive digital filter, designed to imitate transmission characteristics of the echo path, that generates pseudo echo signals responsive to a part of the receiving signals;

a subtracter that subtracts the pseudo echo signals from the sending signals containing echo noise that is input to the microphone from the echo path, to provide an echo canceled sending signal;

wherein tap coefficients of said adaptive digital filter are modified responsive to the part of the receiving signals and a part of the echo canceled sending signal; and an amplifier that amplifies the part of the receiving signals so that an amplitude level of the pseudo echo signals matches an amplitude level of the echo noise, and that provides the amplified part of the receiving signals to said adaptive digital filter as the part of the receiving signals;

wherein the loudspeaker converts the receiving signals that are not amplified by said amplifier.

5. The echo canceller of claim 4, wherein said amplifier is a variable amplifier.

6. The echo canceller of claim 4, wherein said amplifier is a fixed amplifier.

* * * * *